US011860852B1

(12) United States Patent
Harvey

(10) Patent No.: US 11,860,852 B1
(45) Date of Patent: Jan. 2, 2024

(54) SYSTEMS AND METHODS FOR ANALYZING VERACITY OF STATEMENTS

(71) Applicant: State Farm Mutual Automobile Insurance Company, Bloomington, IL (US)

(72) Inventor: Brian N. Harvey, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 703 days.

(21) Appl. No.: 16/543,146

(22) Filed: Aug. 16, 2019

Related U.S. Application Data

(60) Provisional application No. 62/866,929, filed on Jun. 26, 2019, provisional application No. 62/856,473, filed on Jun. 3, 2019.

(51) Int. Cl.
| | |
|---|---|
| *G06F 16/00* | (2019.01) |
| *G06F 16/23* | (2019.01) |
| *G10L 15/22* | (2006.01) |
| *G06F 16/2455* | (2019.01) |
| *G10L 15/26* | (2006.01) |

(52) U.S. Cl.
CPC .... *G06F 16/2365* (2019.01); *G06F 16/24568* (2019.01); *G10L 15/22* (2013.01); *G10L 15/26* (2013.01)

(58) Field of Classification Search
None
See application file for complete search history.

(56) References Cited

U.S. PATENT DOCUMENTS

| | | | |
|---|---|---|---|
| 5,722,418 | A | 3/1998 | Bro |
| 6,523,008 | B1 | 2/2003 | Avrunin et al. |
| 8,666,928 | B2 | 3/2014 | Tunstall-Pedoe |
| 8,705,875 | B1 | 4/2014 | Ricanek, Jr. |
| 9,087,048 | B2 * | 7/2015 | Myslinski ............. A63F 13/828 |

(Continued)

OTHER PUBLICATIONS

Analysis of Emoji and Emoticon Usage in Interpersonal Communication of Blackberry Messenger and WhatsApp Application User, Chairunnisa et al (Year: 2017).*

(Continued)

*Primary Examiner* — Jean M Corrielus
(74) *Attorney, Agent, or Firm* — Armstrong Teasdale LLP

(57) ABSTRACT

The present embodiments may relate to secondary systems that verify potential fraud or the absence thereof. Artificial intelligence and/or chatbots may be employed to verify veracity of statements used in connection with insurance or loan applications, and/or insurance claims. For instance, a veracity analyzer (VA) computing device includes a processor in communication with a memory device, and may be configured to: (1) generate at least one model by analyzing a plurality of historical statements to identify a plurality of reference indicators correlating to inaccuracy of a historical statement; (2) receive a data stream corresponding to a current statement; (3) parse the data stream using the at least one model to identify at least one candidate indicator included in the current statement matching at least one of the plurality of reference indicators; and/or (4) flag, in response to identifying the at least one candidate indicator, the current statement as potentially false.

20 Claims, 6 Drawing Sheets

(56) References Cited

U.S. PATENT DOCUMENTS

| | | | |
|---|---|---|---|
| 9,177,053 | B2 | 11/2015 | Myslinski |
| 9,454,562 | B2 | 9/2016 | Myslinski |
| 9,454,563 | B2* | 9/2016 | Myslinski ......... G06F 16/24578 |
| 9,886,471 | B2* | 2/2018 | Myslinski ............. G06F 16/951 |
| 10,296,982 | B1 | 5/2019 | Bernica et al. |
| 11,151,119 | B2* | 10/2021 | Rendahl ................. G06F 16/93 |
| 11,328,306 | B1* | 5/2022 | Lepeska ............... G06F 16/972 |
| 11,361,165 | B2* | 6/2022 | Barker .................. G06F 16/353 |
| 2007/0118398 | A1 | 5/2007 | Perls |
| 2009/0240524 | A1 | 9/2009 | Bluth |
| 2010/0159127 | A1* | 6/2010 | Lin .......................... B82Y 40/00 427/122 |
| 2012/0330882 | A1 | 12/2012 | Ferrucci et al. |
| 2013/0085925 | A1 | 4/2013 | Simpson |
| 2013/0138428 | A1* | 5/2013 | Chandramouli ........ G06F 40/40 704/9 |
| 2013/0151240 | A1* | 6/2013 | Myslinski .............. G06Q 10/10 704/9 |
| 2013/0158984 | A1* | 6/2013 | Myslinski ............. A63F 13/828 704/9 |
| 2013/0223694 | A1 | 8/2013 | Ricanek, Jr. et al. |
| 2015/0235001 | A1 | 8/2015 | Fouts |
| 2015/0339356 | A1* | 11/2015 | Myslinski .............. G06F 16/248 707/728 |
| 2016/0045829 | A1* | 2/2016 | Myslinski ......... G06F 16/24578 463/29 |
| 2016/0050221 | A1* | 2/2016 | Myslinski ........... G06F 11/3065 726/22 |
| 2016/0063053 | A1* | 3/2016 | Myslinski ............... A63F 13/95 705/329 |
| 2016/0140439 | A1* | 5/2016 | Adderly ................ G06F 16/367 706/46 |
| 2016/0140445 | A1* | 5/2016 | Adderly .................. G06F 40/30 706/52 |
| 2016/0140446 | A1* | 5/2016 | Adderly ................. G06N 5/022 706/51 |
| 2016/0140858 | A1* | 5/2016 | Adderly .................. G06F 40/30 704/9 |
| 2016/0147875 | A1* | 5/2016 | Adderly .................. G06F 40/30 707/726 |
| 2016/0148093 | A1* | 5/2016 | Adderly ................. G06N 5/022 706/46 |
| 2016/0259994 | A1 | 9/2016 | Ravindran et al. |
| 2016/0371321 | A1* | 12/2016 | Myslinski .......... G06Q 30/0241 |
| 2017/0019529 | A1* | 1/2017 | Bostick ................ G06Q 50/265 |
| 2017/0308985 | A1* | 10/2017 | Grom ..................... G06N 5/022 |
| 2017/0308986 | A1* | 10/2017 | Simpson ................ G06N 5/022 |
| 2018/0239832 | A1 | 8/2018 | Galuten |
| 2019/0245974 | A1* | 8/2019 | Dwyer .................. G06F 40/279 |
| 2020/0174991 | A1* | 6/2020 | Rendahl ............ G06Q 30/0245 |
| 2020/0372915 | A1* | 11/2020 | Ishii ........................ G10L 15/24 |
| 2021/0118434 | A1* | 4/2021 | Boxwell ................ G10L 15/02 |

OTHER PUBLICATIONS

Abuhakmeh, Khalid, "Selfie Quote—Using Micorsoft's Oxford API to Provide Health Quotes", Sep. 1, 2015 (Year: 2015).

ORR Hirschauge; Title: Khosla Ventures Invests in Israeli Medical Imaging Startup Zebra; Wall Street Journal; (4 pages) http://blogs.wsj.com/digits/2015/04/06/khosla-ventures-invests-in-israeli--medical-imaging-startup-zebra/.

Dana Dovey; Title: Parkinson's Disease May One Day Be Identified With A Voice Analysis Smartphone App; Medical Daily; (6 pages); http://www.medicaldaily.com/parkinsons-disease-may-one-day-be-identified-- voice-analysis-smartphone-app-278256.\.

Lina Zeldovich; Title: This app claims it can detect cancer by the sound of your voice; Digital Trends; (10 pages); http://www.digitaltrends.com/sports/kijini-health-app/.

Fredo Durand, William T. Freeman, Guha Balakrisnan, Kathrine L. Bouman, Justin G. Chen, Abe Davis, Hossein Mobahi, Michael Rubinstein, Neal Wadhwa, Hao-Yu-Wu, and Tianfan Xue); Title: Video Magnification; (4 pages);http://people.csail.mit.edu/mrub/vidmag/.

\* cited by examiner

SYSTEMS AND METHODS FOR ANALYZING VERACITY OF STATEMENTS

CROSS-REFERENCE TO RELATED APPLICATIONS

This application claims the benefit of priority to U.S. Provisional Patent Application No. 62/856,473, filed Jun. 3, 2019, entitled "SYSTEMS AND METHODS FOR ANALYZING VERACITY OF STATEMENTS," and U.S. Provisional Patent Application No. 62/866,929, filed Jun. 26, 2019, entitled "SYSTEMS AND METHODS FOR ANALYZING VERACITY OF STATEMENTS," the entire contents and disclosures of which are hereby incorporated herein by reference in their entirety.

FIELD OF THE INVENTION

The present disclosure relates to systems and methods for analyzing veracity of statements, and more particularly, to systems and methods for analyzing the veracity of statements based upon indicators generated using artificial intelligence and machine learning techniques.

BACKGROUND

While some known computing devices are used, for example, to collect, transmit, and/or store statements made by human beings, current computing devices are not capable of detecting when humans are making a false or unreliable statement, or detecting when a statement provided by a witness to an accident is inconsistent with other facts related to the accident.

Statements given by individuals are often relied on for various purposes. However, such human provided statements are often not reliable for a variety of reasons, such as when the individual making the statement misremembers the subject matter of the statement or is attempting to deceive someone by making a false statement. For example, insurers depend on statements made by customers when evaluating an application for insurance coverage or processing insurance claims. Inaccurate statements may lead to increased costs that eventually end up being passed onto other insurance customers.

In addition, statements are often collected as part of an automobile accident to determine who is at fault in the accident. Accordingly, there is a need for a review system to assist in the verification of such statements.

BRIEF SUMMARY

The present embodiments may relate to, inter alia, detecting and/or predicting fraud, and reviewing the veracity of statements. Some embodiments may use artificial intelligence, machine learning, and/or chatbots or robo-advisors to verify human analysis of insurance or loan applications or insurance claims, such as verify the veracity of an application or claim to avoid unnecessary expenses caused by or related to inaccurate statements. For instance, expenses, such as buildup or other costs caused by or associated with fraud, may indirectly eventually result in higher insurance costs for innocent and trustworthy customers. Thus, the present embodiments may relate to a secondary insurance or loan application review system, or a secondary insurance claim review system that verifies human review of applications and/or claims, and/or generate an alert to prompt further human review when an inconsistency or inaccuracy is detected.

In one aspect, a veracity analyzer (VA) computing device comprising at least one processor in communication with a memory device may be provided. The processor may be configured to: (1) generate at least one model by analyzing a plurality of historical statements to identify a plurality of reference indicators correlating to at least one inaccurate aspect included in the plurality of historical statements; (2) receive a data stream corresponding to a current statement; (3) parse the data stream using the at least one model to identify at least one candidate indicator included in the current statement matching at least one of the plurality of reference indicators; and/or (4) flag, in response to identifying the at least one candidate indicator, the current statement as potentially false. The VA computing device may be a chatbot or robo-advisor in some embodiments. The VA computing device may include additional, less, or alternate functionality, including that discussed elsewhere herein.

In another aspect, a computer-implemented method for reviewing veracity of statements may be provided. The computer-implemented method may be performed by a veracity analyzer (VA) computing device, which may be a chatbot or robo-advisor, that includes at least one processor in communication with a memory device. The computer-implemented method may include: (1) generating, by the VA computing device, at least one model by analyzing a plurality of historical statements to identify a plurality of reference indicators correlating to at least one inaccurate aspect included in the plurality of historical statements; (2) receiving, by the VA computing device, a data stream corresponding to a current statement; (3) parsing, by the VA computing device the data stream using the at least one model to identify at least one candidate indicator included in the current statement matching at least one of the plurality of reference indicators; and/or (4) flagging, by the VA computing device, in response to identifying the at least one candidate indicator, the current statement as potentially false. The method may include additional, less, or alternate actions, including those discussed elsewhere herein.

In another aspect, a non-transitory computer-readable media having computer-executable instructions embodied thereon may be provided that, when executed by a veracity analyzer (VA) computing device including a processor in communication with a memory device, cause the processor to: (1) generate at least one model by analyzing a plurality of historical statements to identify a plurality of reference indicators correlating to at least one inaccurate aspect included in the plurality of historical statements; (2) receive a data stream corresponding to a current statement; (3) parse the data stream using the at least one model to identify at least one candidate indicator included in the current statement matching at least one of the plurality of reference indicators; and/or (4) flag, in response to identifying the at least one candidate indicator, the current statement as potentially false. The instructions may direct additional, less, or alternate functionality, including that discussed elsewhere herein.

In another aspect, a chatbot computing device that includes at least one processor in communication with a memory device may be provided. The processor may be configured to (1) generate at least one model by analyzing a plurality of historical statements to identify a plurality of reference indicators correlating to at least one inaccurate aspect included in the plurality of historical statements; (2) receive, from a user computing device associated with a user, a data stream corresponding to a current statement; (3) parse the data stream using the at least one model to identify at least one candidate indicator included in the current statement matching at least one of the plurality of reference indicators; (4) flag, in response to identifying the at least one candidate indicator, the current statement as potentially false; (5) generate a response message based upon the current statement and the flag; and/or (6) transmit the response message to the user computing device. The chatbot computing device may include additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
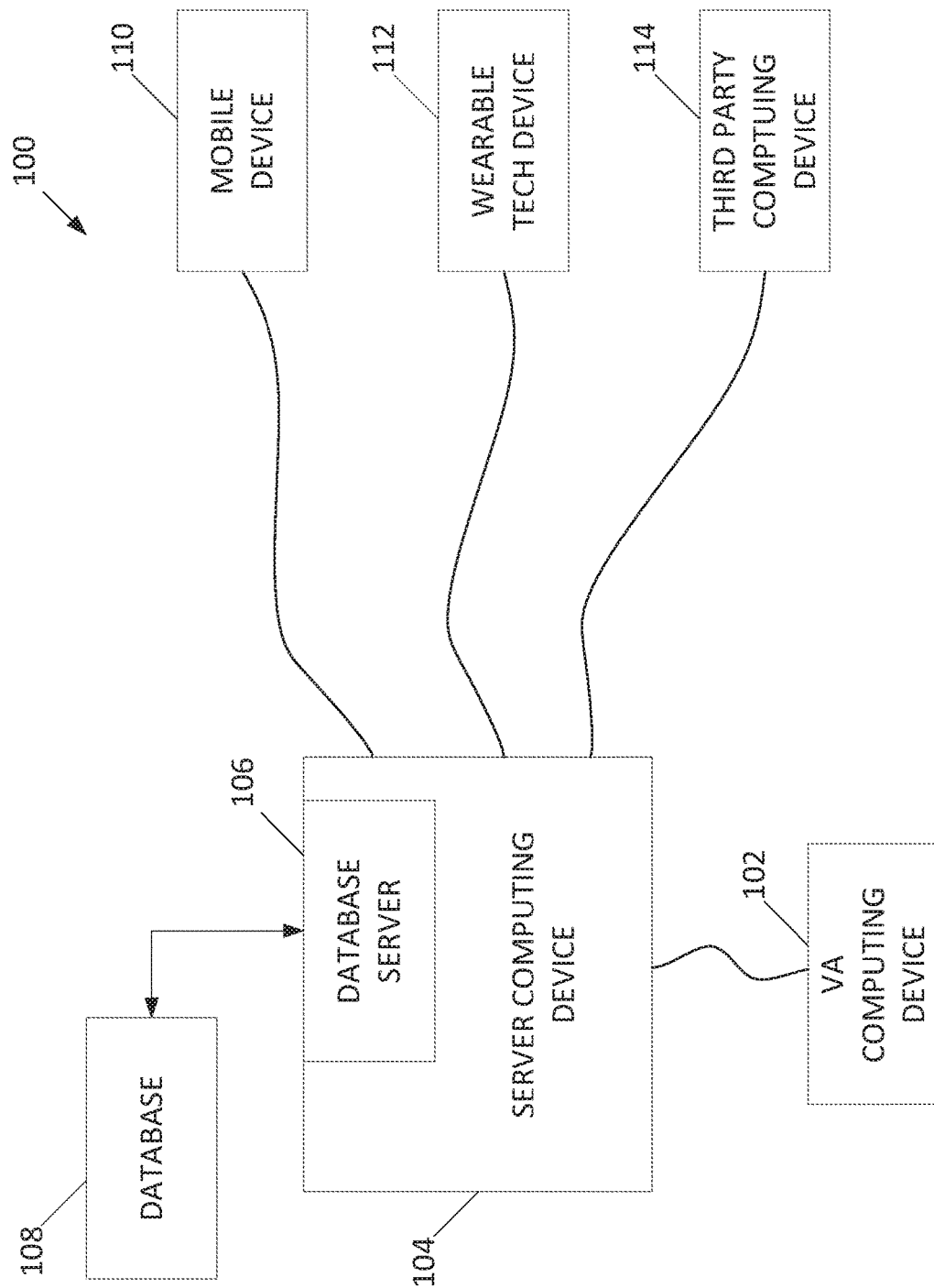
FIG. 1 depicts an exemplary veracity analyzer ("VA") system for analyzing the veracity of statements in accordance with an exemplary embodiment of the present disclosure.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for reviewing the veracity of statements provided by individuals. The systems and methods described herein may be used with or integrated with a secondary insurance or loan application review system or a secondary insurance claim review system. As used herein, a statement is an assertion of fact made by a human being that may include associated text, audio, and/or video data. As used herein, an aspect of a statement is a portion of a statement including an assertion of fact that can be proven true of false.

The systems and methods described herein may include generating at least one model by analyzing a plurality of historical statements to identify reference indicators correlating to at least one inaccurate aspect included in the plurality of historical statements. The reference indicators may include, for example, inflection or tone of voice correlating to inaccurate of a historical statements, body language correlating to inaccurate historical statements, inconsistencies between multiple associated historical statements (e.g., historical statements regarding the same accident), and/or inconsistencies between a historical statement and forensic evidence associated with the subject matter of the historical statement.

Accordingly, the generated models may include, for example, an inflection of voice model, a body language model, an inconsistent statement model, and/or a forensic model. The systems and methods may further include receiving a data stream corresponding to at least one statement to be analyzed for accuracy (sometimes referred to herein as a "current statement"). The systems and methods may further include parsing the data stream using the models to identify at least one candidate indicator included in the current statement matching at least one of the reference indicators. The presence of the candidate indicators in the current statement that match the reference indicators that are correlated with inaccurate statements suggests that the current statement is also potentially inaccurate. In one exemplary embodiment, the process may be performed by a veracity analyzer ("VA") computing device.

As described below, the systems and methods described herein analyze current statements by comparing data included within the statements (e.g., audio, video, or text) to a plurality of reference indicators, wherein the reference indicators are generated based upon an analysis of a plurality of historical statements through, for example, artificial intelligence (AI) and/or machine learning techniques. By so doing, the systems and methods are able to analyze the veracity of the current statements and flag the statements as being likely true or potentially inaccurate. Further, the systems and methods may identify particular aspects of a statement that are potentially inaccurate.

In some embodiments, the systems and methods may include a chatbot that is capable of generating text or voice messages that are provided to a user in response to text or voice messages being submitted by the user to simulate a conversation with a human being. For example, the chatbot may be a robo-advisor that assists a user, for example, in making an insurance claim, in obtaining an insurance policy, and/or in another financial application where the user may submit statements to the robo-advisor. The responses may be generated using, for example, keyword analysis, natural language processing, and/or machine learning techniques. Such questions and generated responses may be, for example, in the form of text (e.g., email, short message service (SMS) messages, or chat messages) or voice. In such embodiments, the chatbot may be configured to analyze the veracity of statements submitted to the chatbot by the user, flag the statements as being likely true or potentially inaccurate, and generate responses (e.g., text or voice messages) based upon the determination that the statements are likely true or potentially inaccurate.

Generating Models by Identifying Reference Indicators Associated with False Statements The VA computing device may generate models by analyzing historical statements to identify reference indicators correlated to at least one inaccurate aspect included in the plurality of historical statements. The reference indicators may be portions of data corresponding to statements (e.g., audio, video, or text data) that are correlated with falsity of the statement and/or an aspect of the statement. For example, a determination that an analyzed statement includes aspects that conflict with another statement, or that an analyzed statement includes aspects that conflict with known forensics data, may show that the analyzed statement is likely inaccurate. Other reference indicators may include, for example, tone and inflection of voice and/or body language (e.g., posture, head and eye movement, and/or facial expressions) that are determined to be correlated with falsity of the statement. The VA computing device may generate models corresponding to different types of reference indicators (e.g., an inflection of voice model, a body language model, an inconsistent statement model, and/or a forensic model).

The VA computing device may generate the models by analyzing a large number of historical statements. The historical statements may include, for example, audio data (e.g., voice calls an audio records of interviews), video data (e.g., video calls and video records of interviews), and text data (e.g., email, short message service (SMS) messages, online chat messages, or a transcription of audio). In certain embodiments, some of the historical statements may include aspects having a known true or false value. Using, for example, AI and/or machine learning techniques, as described below, the VA computing device may categorize each of the large number of historical statements as either true or false, and identify reference indicators that are correlated with inaccurate aspects of the historical statements.

The VA computing device may generate models corresponding to the analysis of audio and/or video data (e.g., the inflection of voice model and/or the body language model). An individual making a statement may show certain behaviors that potentially indicate that the individual knows the statement is false and is trying to deceive the party receiving the statement. Even if the individual making the statement is not attempting deception, certain behaviors of the individual may indicate the individual's statement may not be accurate (e.g., behavior indicating the individual may have difficulty remembering the subject matter of the statement).

Such reference indicators (e.g., tone and inflection of voice and/or body language), when captured and encoded into audio and video data, are manifested as certain data patterns within the audio and video data. The VA computing device may determine whether the historical statements are true and/or false, and determine that the reference indicators (e.g., the data patterns) are correlated with the inaccurate statements. Accordingly, the VA computing device may determine that future statements containing these audio and/or visual reference indicators are potentially inaccurate.

In some embodiments, the large number of historical statements may be stored in a database. When the VA computing device receives additional statements, as described below, the VA computing device may store the additional statements in the database, enabling the VA computing device to continually generate and refine the models using AI and/or machine learning techniques based a larger and larger number of historical statements.

In some embodiments, the VA computing device may store the generated models, for example, in a database. The VA computing device may then use the database of models when analyzing future statements.

Receiving a Data Stream Corresponding to a Current Statement

The VA computing device may receive a data stream corresponding to a statement to be analyzed by the VA computing device for accuracy (sometimes referred to herein as a "current statement"). The data stream may include a variety of different types of data corresponding to the current statement (e.g., audio, video, or text). The data may be received from a variety of different sources.

In some embodiments, the data stream may be associated with a real-time telephone call or video call. The call may be, for example, a traditional or internet protocol (IP) telephone call, a video call through a video call service or platform, or a voice or video call received directly by the VA computing device, for example, through an online platform or mobile application ("app"). In certain embodiments, the VA computing device may transcribe an audio signal of the call to obtain text data. The VA computing device may analyze the incoming data stream as the call is occurring, enabling the VA computing device to identify potential inaccuracy of the current statement in real time and generate corresponding alerts. Alternatively, the VA computing device may generate or receive a recording of the call and analyze the recording after the call is completed.

In some embodiments, the data stream received by the VA computing device may include previously recorded audio, video, and/or text. Text statements may include, for example, previous email, SMS, or online chat messages. In some embodiments where the VA computing device analyzes audio and video records, the VA computing device may transcribe a recorded audio signal to obtain text data. The VA computing device may retrieve such records from, for example, a database or another computing device associated with a third party.

In some embodiments, the VA computing device may be a chatbot or robo-advisor, and the VA computing device may receive the statements as, for example, chat messages submitted by a user via a mobile app or website. In such embodiments, the VA computing device may generate and transmit responses to the user in addition to analyzing the veracity of the statements, as described below. The VA computing device may generate the responses using, for example, keyword analysis, natural language processing, and/or machine learning techniques. In certain embodiments, the generated responses may depend on detection by the VA computing device of inaccuracy in the statements submitted by the user.

In some embodiments, the VA computing device may be in communication with a device capable of capturing a stream of data to be analyzed. For example, a representative interviewing an individual may capture audio and video data using a mobile device and/or wearable technology (e.g., smart glasses). This data may be transmitted to the VA computing device. Alternatively, the VA computing device may be implemented as a device capable of capturing such data (e.g., smart glasses).

Parsing the Data Stream to Identify Candidate Indicators Matching Reference Indicators The VA computing device may parse the data stream to identify candidate indicators matching a portion of the data stream. Candidate indicators are portions of the data stream that match a reference indicator. Accordingly, the presence of candidate indicators in a data stream including a current statement is correlated with inaccuracy of the current statement. To identify portions of the data stream matching the indicators, the VA computing device may match the portions of the data stream to the reference indicators using the generated models. Accordingly, the VA computing device may determine that statements corresponding to such portions of the data stream are potentially inaccurate.

In some embodiments, the VA computing device may parse text data associated with the data stream including the current statement. For example, the VA computing device may parse the text data for words or phrases determined to be correlated with falsity of the statement. Such words or phrases may include examples of candidate indicators that match reference indicators identified by the VA computing device as described above.

In some embodiments, the VA computing device may receive a data stream including a story having a plurality of current statements. The VA computing device may analyze the content of each of the plurality of current statements and compare the current statements to each other to identify inconsistencies or conflicts that may indicate falsity of the current statements. Further, where a previous statement has been made regarding, for example, the same event, the VA computing device may compare the current statement to the previous statement to identify inconsistencies or conflicts. The VA computing device may determine that such conflicts indicate the statement is potentially inaccurate.

In some embodiments, the VA computing device may parse audio and/or video data associated with the data stream. Candidate indicators such as tone and inflection of voice, head and eye movement, body language, or facial expressions may be manifested as patterns within the audio and/or video data. The VA computing device may parse the data stream using the models (e.g., the inflection of voice model and/or the body language model) for such candidate indicators matching the reference indicators determined to be correlated with falsity of the statement.

Flagging Current Statements as Potentially False

The VA computing device may further flag current statements as potentially false in response to identifying candidate indicators in the current statement that match reference indicators. In embodiments where the current statement is analyzed in real time, the VA computing device may display a real-time alert indicating that a potentially false statement has been detected, enabling an interviewer, for example, to ask a follow-up question to attempt to verify the current statement or obtain an accurate statement. In embodiments where the current statement corresponds to a previous recording, the VA computing device may flag the aspect (e.g., a portion) of the current statement that is potentially false (e.g., text of the potentially false statement or a timestamp of an audio and/or video recording), so that the aspect of the current statement may be investigated further.

In embodiments where the VA computing device is a chatbot or robo-advisor, the VA computing device may generate responses to statements (e.g., chat messages) submitted by a user that depend on the flagging of the submitted statement as potentially false.

The VA computing device may further generate recommendations to a user for obtaining accurate statements in response to determining that the current statement is potentially inaccurate. For example, where the VA computing device identifies a current statement conflicting with forensic evidence and/or a previous statement made by the same or another individual, the VA computing device may display an alert message prompting an interviewer to inquire about the forensic evidence and/or differences between the two statements. The alert message may include, for example, the forensic evidence and/or at least one aspect of the previous statement conflicting with the current statement.

Chatbot Applications of the VA Computing Device

In some embodiments, the VA computing device may be a chatbot computing device configured to generate text and/or voice messages that are provided to a user in response to text or voice messages being submitted by the user. For example, the chatbot may be a robo-advisor that assists a user, for example, in making an insurance claim, in obtaining an insurance policy, and/or in another financial application where the user may submit statements to the robo-advisor. The VA computing device may generate the responses using, for example, keyword analysis, natural language processing, and/or machine learning techniques. Such questions and generated responses may be, for example, in the form of text (e.g., email, SMS messages, or chat messages) or voice.

The VA computing device, being utilized as a chatbot computing device, may receive a current statement from a user. The current statement may be, for example, an audio (e.g., voice), video, or text message (e.g., an email, SMS message, or chat message). Such messages may be submitted to the VA computing device using, for example, a mobile app running on a mobile device. The message may be submitted by the user, for example, in response to a question message transmitted to the user by the VA computing device. The VA computing device may analyze the veracity of the submitted messages and flag the messages as potentially false, as described above.

The VA computing device may generate a response message including a response to the current statement submitted by the user. For example, the response message may include a question following up on the current statement. The response message may be generated, for example, using keyword analysis, natural language processing, and/or machine learning techniques. In a keyword analysis, keywords (e.g., particular predetermined words or phrases) are identified in the current statement, and the response depends upon the identified keywords. In natural language processing, natural language (e.g., speech) of the user is analyzed to determine the meaning of the natural language. Machine learning techniques may be utilized to generate a response based on identified keywords, meanings, or other patterns in the current statement. The response may further depend upon the determination that the current statement is potentially inaccurate. For example, the response message may identify information that contradicts the current statement of the user (e.g., a previous statement of the user inconsistent with the current statement.

Insurance Applications of the VA Computing Device

In some embodiments, the VA computing device may be used to verify the veracity of statements made by insured individuals to their insurer. For example, an insured individual may submit one or more statements to the insurer, such as a statement by a claimant describing a loss or a statement by an individual purchasing insurance about the value or condition of property to be covered. An insurance representative receiving the statement may use the VA computing device in order to review the statement.

In such embodiments, the statement may be received by the VA computing device in a variety of ways. For example, the insured individual may submit the statement through a phone call, video call, an email, an SMS message, or an online chat message. In certain embodiments, the insurer may provide an app through which the insured individual may submit a statement through a chat message, voice call, or video call. In some embodiments, the VA computing device may be a chatbot or robo-advisor associated with a service provided by the insurer, and the user may submit the statements, for example, as chat messages to the VA computing device. In some embodiments, an insurance representative may carry a wearable technology device (e.g., smart glasses) to capture audio and/or video of a statement made by the insured individual in person. In embodiments where the insurance representative may conduct a real-time interview of the individual making the statement (e.g., in person or through a voice or video call), the VA computing device may detect potentially inaccurate statements in real time and display the alerts to the insurance representative. The alerts may be displayed, for example, through the wearable technology device.

In some embodiments, users (e.g., insured individuals making statements to be analyzed) may enroll in services provided by the VA computing device. For example, enrolling in insurance services utilizing the VA computing device may include an opt-in procedure where users "opt-in" (e.g., provide informed consent) to having statements made to the insurer by the users recorded and analyzed by the VA computing device. This allows any services using the VA computing device to be in compliance with consumer protection laws and privacy regulations. Thus, a user consents to having the user's statements recorded and analyzed by the VA computing device when they enroll in a service that uses the VA computing device. In other embodiments, the user may opt in and provide consent by transmitting an affirmative consent message to the VA computing device. The consent message may indicate user consent from the user in having the user's statements recorded and analyzed by the VA computing device.

At least one of the technical problems addressed by this system may include: (i) inability of computing devices to identify indicators of inaccuracy of a human statement; (ii) inability of computing devices to detect inaccuracy of a human statement; (iii) delay in verifying human statements; (iv) delay in computer-based processes due to the need for human input; (v) increased security risk due to the need for human input; and (vi) increased risk or error due to reliance on human input.

A technical effect of the systems and processes described herein may be achieved by performing at least one of the following steps: (i) generating at least one model by analyzing a plurality of historical statements to identify a plurality of reference indicators correlating to at least one inaccurate aspect included in the plurality of historical statements; (ii) receiving a data stream corresponding to a current statement; (iii) parsing the data stream using the at least one model to identify at least one candidate indicator included in the current statement matching at least one of the plurality of reference indicators; and (iv) flagging, in response to identifying the at least one candidate indicator, the current statement as potentially false.

The technical effect achieved by this system may be at least one of: (i) ability for computing devices to identify and generate indicators of inaccuracy of a human statement; (ii) ability for computing devices to detect inaccuracy of a human statement; (iii) ability of a computing device receiving a statement to generate real-time alerts that the statement is potentially inaccurate; (iv) increased efficiency of a computerized insurance claims process by verifying the accuracy of statements submitted to an insurer in real time; (v) increased security due to reduced reliance on human input; and (vi) fewer system processing errors due to reduced reliance on human input.

Exemplary System for Analyzing Statement Veracity

FIG. 1 depicts an exemplary VA system 100. VA system 100 may include a VA computing device 102. VA computing device 102 may be in communication with a server computing device 104 having a database server 106. VA computing device 102 may communicate with, for example, one or more of a database 108, a mobile device 110, a wearable technology device 112, or a third party computing device 114 via server computing device 104.

VA computing device 102 may generate models by analyzing historical statements to identify reference indicators correlated to at least one inaccurate aspect included in the plurality of the historical statements. The reference indicators may be portions of data corresponding to statements (e.g., audio, video, or text data) that are correlated with falsity of the statement and/or an aspect of the statement.

For example, a determination that an aspect of an analyzed statement conflicts with another statement, or that an aspect of an analyzed statement conflicts with known forensics data, may show that the analyzed statement is likely inaccurate. Other reference indicators may include, for example, tone and inflection of voice, posture, head and eye movement, and/or facial expressions that are determined to be correlated with falsity of the statement. VA computing device 102 may generate models corresponding to different types of reference indicators (e.g., an inflection of voice model, a body language model, an inconsistent statement model, and/or a forensic model).

VA computing device 102 may generate the models by analyzing a large number of historical statements. The historical statements may include, for example, audio data (e.g., voice calls an audio records of interviews), video data (e.g., video calls and video records of interviews), and text data (e.g., email, short message service (SMS) messages, online chat messages, or a transcription of audio). In certain embodiments, some of the historical statements may include aspects having a known true or false value. Using, for example, AI and/or machine learning techniques, as described below, VA computing device 102 device may categorize each of the large number of historical statements as either true or false, and identify reference indicators that are correlated with inaccurate aspects of the historical statements.

VA computing device 102 may generate models corresponding to the analysis of audio and/or video data (e.g., the inflection of voice model and/or the body language model). An individual making a statement may show certain behaviors that potentially indicate that the individual knows the statement is false and is trying to deceive the party receiving the statement. Even if the individual making the statement is not attempting deception, certain behaviors of the individual may indicate the individual's statement may not be accurate (e.g., behavior indicating the individual may have difficulty remembering the subject matter of the statement). Such reference indicators (e.g., tone and inflection of voice, posture, head and eye movement, or facial expressions), when captured and encoded into audio and video data, are manifested as certain data patterns within the audio and video data. VA computing device 102 may determine whether the historical statements are true and/or false, and determine that the reference indicators (e.g., the data patterns) are correlated with the inaccurate statements. Accordingly, VA computing device 102 may determine that future statements containing these audio and/or visual reference indicators are potentially inaccurate.

In some embodiments, the large number of historical statements may be stored in database 108. When VA computing device 102 receives additional statements, as described below, VA computing device 102 may store the additional statements in database 108, enabling VA computing device 102 to continually generate and refine the models using AI and/or machine learning techniques based a larger and larger number of historical statements.

In some embodiments, VA computing device 102 may store the generated models, for example, in database 108. VA computing device 102 may then use models stored in database 108 when analyzing future statements.

VA computing device 102 may receive a data stream corresponding to a statement to be analyzed by the VA computing device 102 for accuracy (sometimes referred to herein as a "current statement"). The data stream may include a variety of different types of data corresponding to the current statement (e.g., audio, video, or text). The data may be received from a variety of different sources.

In some embodiments, the data stream may be associated with a real-time telephone call or video call. The call may be, for example, a traditional or internet protocol (IP) telephone call, a video call through a video call service or platform, or a voice or video call received directly by VA computing device 102, for example, through an online platform or mobile application ("app"). In certain embodiments, VA computing device 102 may transcribe an audio signal of the call to obtain text data. VA computing device 102 may analyze the incoming data stream as the call is occurring, enabling VA computing device 102 to identify potentially inaccuracy of the current statement in real time and generate corresponding alerts. Alternatively, VA computing device 102 may generate or receive a recording of the call and analyze the recording after the call is completed.

In some embodiments, the data stream received by VA computing device 102 may be of previously recorded audio, video, and/or text. Text statements may include, for example, email, SMS, or online chat messages. In embodiments where VA computing device 102 analyzes audio and video records, VA computing device 102 may transcribe a recorded audio signal to obtain text data. VA computing device 102 may retrieve such records from, for example, database 108 or third party computing device 114 associated with a third party.

In some embodiments, VA computing device 102 may be a chatbot or robo-advisor, and the VA computing device may receive the statements as, for example, chat messages submitted by a user via a mobile app or website (e.g., using mobile device 110). In such embodiments, VA computing device 102 may generate and transmit responses to the user (e.g., via mobile device 110) in addition to analyzing the veracity of the statements. VA computing device 102 may generate the responses using, for example, keyword analysis, natural language processing, and/or machine learning techniques. In certain embodiments, the generated responses may depend on detection by VA computing device 102 of inaccuracy in the statements submitted by the user.

In some embodiments, VA computing device 102 may be in communication with a device capable of capturing a stream of data to be analyzed. For example, a representative interviewing an individual may capture audio and video data using a device such as wearable technology device 112 (e.g., smart glasses). This data may be transmitted to VA computing device 102. Alternatively, VA computing device 102 may be implemented as a device capable of capturing such data (e.g., smart glasses).

VA computing device 102 may parse the data stream to identify candidate indicators matching a portion of the data stream. Candidate indicators are portions of the data stream that match a reference indicator. Accordingly, the presence of candidate indicators in a data stream including a current statement is correlated with inaccuracy of the current statement. To identify portions of the data stream matching the indicators, VA computing device 102 may match the portions of the data stream to the reference indicators using the generated models. Accordingly, VA computing device 102 may determine that statements corresponding to such portions of the data stream are potentially inaccurate.

In some embodiments, VA computing device 102 may parse text data associated with the data stream including the current statement. For example, VA computing device 102 may parse the text data for words or phrases determined to be correlated with falsity of the statement. Such words or phrases may include examples of candidate indicators that match reference indicators identified by the VA computing device 102 as described above.

In some embodiments, VA computing device 102 may receive a data stream including a story having a plurality of current statements. VA computing device 102 may analyze the content of each of the plurality of current statements and compare the current statements to each other to identify inconsistencies or conflicts that may indicate falsity of the current statements. Further, where a previous statement has been made regarding, for example, the same event, VA computing device 102 may compare the current statement to the previous statement to identify inconsistencies or conflicts. VA computing device 102 may determine that such conflicts indicate the statement is potentially inaccurate.

In some embodiments, VA computing device 102 may parse audio and/or video data associated with the data stream. Candidate indicators such as tone and inflection of voice, head and eye movement, body language, or facial expressions may be manifested as patterns within the audio and/or video data. VA computing device 102 may parse the data stream using the models (e.g., the infliction of voice model and/or the body language model) for such candidate indicators matching the reference indicators determined to be correlated with falsity of the statement.

VA computing device 102 may further flag current statements as potentially false in response to identifying candidate indicators in the current statement that match reference indicators. In embodiments where the current statement is analyzed in real time, VA computing device 102 may display a real-time alert (e.g., using wearable technology device 112) indicating that a potentially false statement has been detected, enabling an interviewer, for example, to ask a follow-up question to attempt to verify the current statement or obtain an accurate statement. In embodiments where the current statement corresponds to a previous recording, VA computing device 102 may flag the aspect (e.g., a portion) of the current statement that is potentially false (e.g., text of the potentially false statement or a timestamp of an audio and/or video recording), so that the aspect of the current statement may be investigated further.

In embodiments where VA computing device 102 is a chatbot or robo-advisor, VA computing device 102 may generate responses to statements (e.g., chat messages) submitted by a user that depend on the flagging of the submitted statement as potentially false.

VA computing device 102 may further generate recommendations to a user for obtaining accurate statements in response to determining that the current statement is potentially inaccurate. For example, where VA computing device 102 identifies a current statement conflicting with forensic evidence and/or a previous statement made by the same or another individual, VA computing device 102 may display an alert message (e.g., using wearable technology device 112) prompting an interviewer to inquire about the forensic evidence and/or differences between the two statements. The alert message may include, for example, the forensic evidence and/or at least one aspect of the previous statement conflicting with the current statement.

In some embodiments, VA computing device 102 may be a chatbot computing device configured to generate text and/or voice messages that are provided to a user in response to text or voice messages being submitted by the user. For example, VA computing device 102 may be a robo-advisor that assists a user, for example, in making an insurance claim, in obtaining an insurance policy, and/or in another financial application where the user may submit statements to the robo-advisor. VA computing device 102 may generate the responses using, for example, keyword analysis, natural language processing, and/or machine learning techniques. Such questions and generated responses may be, for example, in the form of text (e.g., email, SMS messages, or chat messages) or voice.

VA computing device 102, being utilized as a chatbot computing device, may receive a current statement from a user. The current statement may be, for example, an audio (e.g., voice), video, or text message (e.g., an email, SMS message, or chat message). Such messages may be submitted to VA computing device using, for example, a mobile app running on mobile device 110. The message may be submitted by the user, for example, in response to a question message transmitted to the user by VA computing device 102. VA computing device 102 may analyze the veracity of the submitted messages and flag the messages as potentially false, as described above.

VA computing device 102 may generate a response message including a response to the current statement submitted by the user. For example, the response message may include a question following up on the current statement. The response message may be generated, for example, using keyword analysis, natural language processing, and/or machine learning techniques. In a keyword analysis, keywords (e.g., particular predetermined words or phrases) are identified in the current statement, and the response depends upon the identified keywords. In natural language processing, natural language (e.g., speech) of the user is analyzed to determine the meaning of the natural language. Machine learning techniques may be utilized to generate a response based on identified keywords, meanings, or other patterns in the current statement. The response may further depend upon the determination that the current statement is potentially inaccurate. For example, the response message may identify information that contradicts the current statement of the user (e.g., a previous statement of the user inconsistent with the current statement.

In some embodiments, VA computing device 102 may be used to verify the veracity of statements made by insured individuals to their insurer. For example, an insured individual may submit one or more statements to the insurer, such as a statement by a claimant describing a loss or a statement by an individual purchasing insurance about the value or condition of property to be covered. An insurance representative receiving the statement may use VA computing device 102 in order to review the statement.

In such embodiments, the statement may be received by VA computing device 102 in a variety of ways. For example, the insured individual may submit the statement through a phone call, video call, an email, an SMS message, or an online chat message. In certain embodiments, the insurer may provide a mobile app through which the insured individual may submit a statement through a chat message, voice call, or video call on mobile device 110. In some embodiments, VA computing device 102 may be a chatbot or robo-advisor associated with a service provided by the insurer, and the user may submit the statements, for example, as chat messages to VA computing device 102. In some embodiments, an insurance representative may carry wearable technology device 112 (e.g., smart glasses) to capture audio and/or video of a statement made by the insured individual in person. In embodiments where the insurance representative may conduct a real-time interview of the individual making the statement (e.g., in person or through a voice or video call), VA computing device may detect potentially false statements in real time and display the alerts to the insurance representative. The alerts may be displayed, for example, through wearable technology device 112.

In some embodiments, users (e.g., insured individuals making statements to be analyzed) may enroll in services provided by VA computing device 102. For example, enrolling in insurance services utilizing VA computing device 102 may include an opt-in procedure where users "opt-in" (e.g., provide informed consent or authorization) to having statements made to the insurer by the users recorded and analyzed by VA computing device 102. This allows any services using VA computing device 102 to be in compliance with consumer protection laws and privacy regulations. Thus, a user consents to having the user's statements recorded and analyzed by VA computing device 102 when they enroll in a service that uses VA computing device 102, and in return the user may be entitled to insurance discounts, lower premiums, or other cost-savings. In other embodiments, the user may opt in and provide consent by transmitting an affirmative consent message to VA computing device 102. The consent message may indicate user consent from the user in having the user's statements recorded and analyzed by VA computing device 102.

Exemplary Client Computing Device

Figure 2:
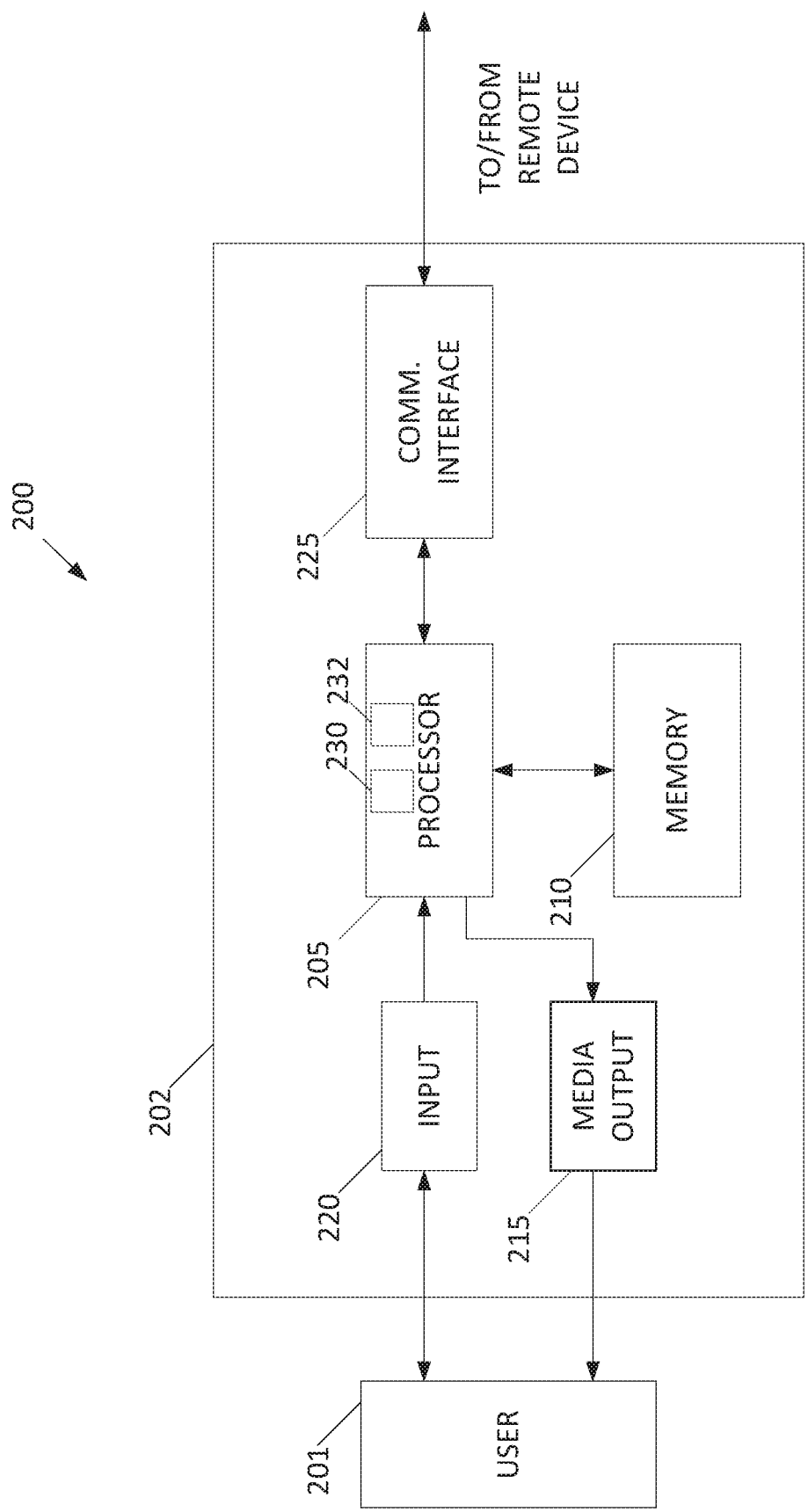
FIG. 2 depicts an exemplary client computing device that may be used with the VA system illustrated in FIG. 1.

FIG. 2 depicts an exemplary client computing device 202 that may be used with VA system 100 shown in FIG. 1. Client computing device 202 may be, for example, at least one of VA computing devices 102, mobile device 110, wearable technology device 112, and/or third party computing device 114 (all shown in FIG. 1).

Client computing device 202 may include a processor 205 for executing instructions. In some embodiments, executable instructions may be stored in a memory area 210. Processor 205 may include one or more processing units (e.g., in a multi-core configuration). Memory area 210 may be any device allowing information such as executable instructions and/or other data to be stored and retrieved. Memory area 210 may include one or more computer readable media.

In the exemplary embodiments, processor 205 may be configured to generate, based upon statement data corresponding to a plurality of statements, a plurality of indicators, wherein the plurality of indicators are correlated with false statements. Processor 205 may be further configured to receive a data stream corresponding to at least one statement. Processor 205 may be further configured to parse the data stream to identify, from the plurality of indicators, at least one indicator matching a portion of the data stream. Processor 205 may be further configured to flag, in response to identifying the at least one indicator, the statement as potentially false.

In exemplary embodiments, processor 205 may include and/or be communicatively coupled to one or more modules for implementing the systems and methods described herein. Processor 205 may include an analytics module 230 configured to generate at least one model by analyzing a plurality of historical statements to identify a plurality of reference indicators correlating to at least one inaccurate aspect included in the plurality of historical statements. Analytics module 230 may utilize AI and/or machine learning techniques to generate the model. Processor 205 may further include a parsing module 232 configured to parse a data stream using the at least one model to identify at least one candidate indicator included in the current statement matching at least one of the plurality of reference indicators and flag, in response to identifying the at least one candidate indicator, the current statement as potentially false.

In exemplary embodiments, client computing device 202 may also include at least one media output component 215 for presenting information to a user 201. Media output component 215 may be any component capable of conveying information to user 201. In some embodiments, media output component 215 may include an output adapter such as a video adapter and/or an audio adapter. An output adapter may be operatively coupled to processor 205 and operatively couplable to an output device such as a display device (e.g., a liquid crystal display (LCD), light emitting diode (LED) display, organic light emitting diode (OLED) display, cathode ray tube (CRT) display, "electronic ink" display, or a projected display) or an audio output device (e.g., a speaker or headphones). Media output component 215 may be configured to, for example, display an alert message identifying a statement as potentially false. In some embodiments, media output component 215 may include smart glasses (e.g., wearable tech device 112) including a display device and/or an audio output device.

Client computing device 202 may also include an input device 220 for receiving input from user 201. Input device 220 may include, for example, a keyboard, a pointing device, a mouse, a stylus, a touch sensitive panel (e.g., a touch pad or a touch screen), a gyroscope, an accelerometer, a position detector, or an audio input device (e.g., a microphone). A single component such as a touch screen may function as both an output device of media output component 215 and input device 220. In some embodiments, input device 220 may include smart glasses (e.g., wearable tech device 112) including, for example, an audio input device and/or camera.

Client computing device 202 may also include a communication interface 225, which can be communicatively coupled to a remote device such as VA computing device 102 (shown in FIG. 1). Communication interface 225 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)). In exemplary embodiments, communication interface 225 may enable, for example, VA computing device 102 to receive a data stream corresponding to a current statement.

Stored in memory area 210 may be, for example, computer-readable instructions for providing a user interface to user 201 via media output component 215 and, optionally, receiving and processing input from input device 220. A user interface may include, among other possibilities, a web browser and client application. Web browsers may enable users, such as user 201, to display and interact with media and other information typically embedded on a web page or a website. A client application may allow user 201 to interact with a server application from VA computing device 102 via server computing device 104 (both shown in FIG. 1).

Memory area 210 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Exemplary Server System

Figure 3:
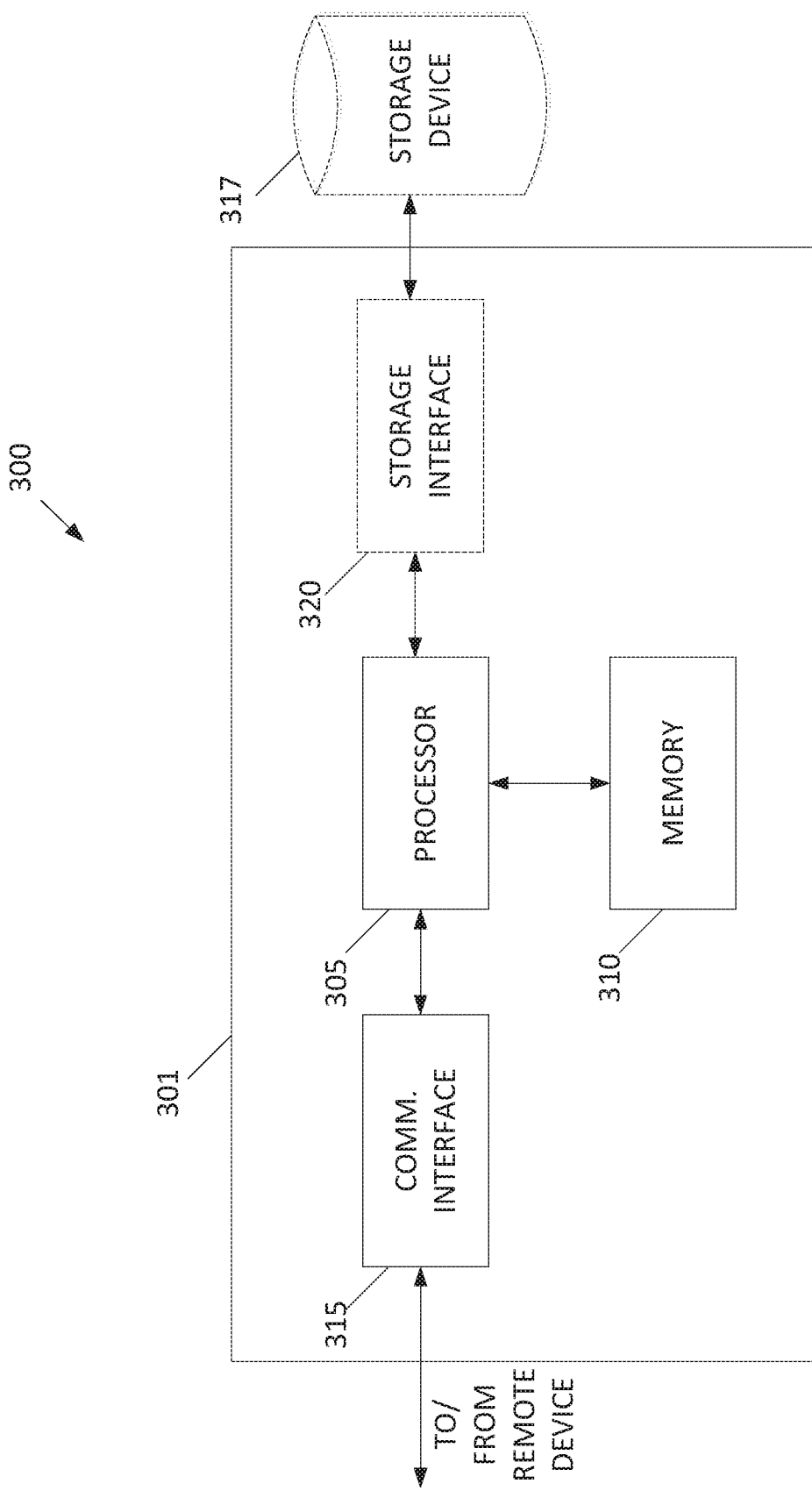
FIG. 3 depicts an exemplary server system that may be used with the VA system illustrated in FIG. 1.

FIG. 3 depicts an exemplary server system 301 that may be used with VA system 100 illustrated in FIG. 1. Server system 301 may be, for example, server computing device 104 (shown in FIG. 1).

In exemplary embodiments, server system 301 may include a processor 305 for executing instructions. Instructions may be stored in a memory area 310. Processor 305 may include one or more processing units (e.g., in a multi-core configuration) for executing instructions. The instructions may be executed within a variety of different operating systems on server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C #, C++, Java, or other suitable programming languages, etc.).

Processor 305 may be operatively coupled to a communication interface 315 such that server system 301 is capable of communicating with VA computing device 102, mobile device 110, wearable technology device 112, and third party computing device 114 all shown in FIG. 1), or another server system 301. For example, communication interface 315 may receive requests from wearable technology device 112 via the Internet.

Processor 305 may also be operatively coupled to a storage device 317, such as database 120 (shown in FIG. 1). Storage device 317 may be any computer-operated hardware suitable for storing and/or retrieving data. In some embodiments, storage device 317 may be integrated in server system 301. For example, server system 301 may include one or more hard disk drives as storage device 317. In other embodiments, storage device 317 may be external to server system 301 and may be accessed by a plurality of server systems 301. For example, storage device 317 may include multiple storage units such as hard disks or solid state disks in a redundant array of inexpensive disks (RAID) configuration. Storage device 317 may include a storage area network (SAN) and/or a network attached storage (NAS) system.

In some embodiments, processor 305 may be operatively coupled to storage device 317 via a storage interface 320. Storage interface 320 may be any component capable of providing processor 305 with access to storage device 317. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 317.

Memory area 310 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Exemplary Method for Analyzing Statement Veracity

Figure 4:
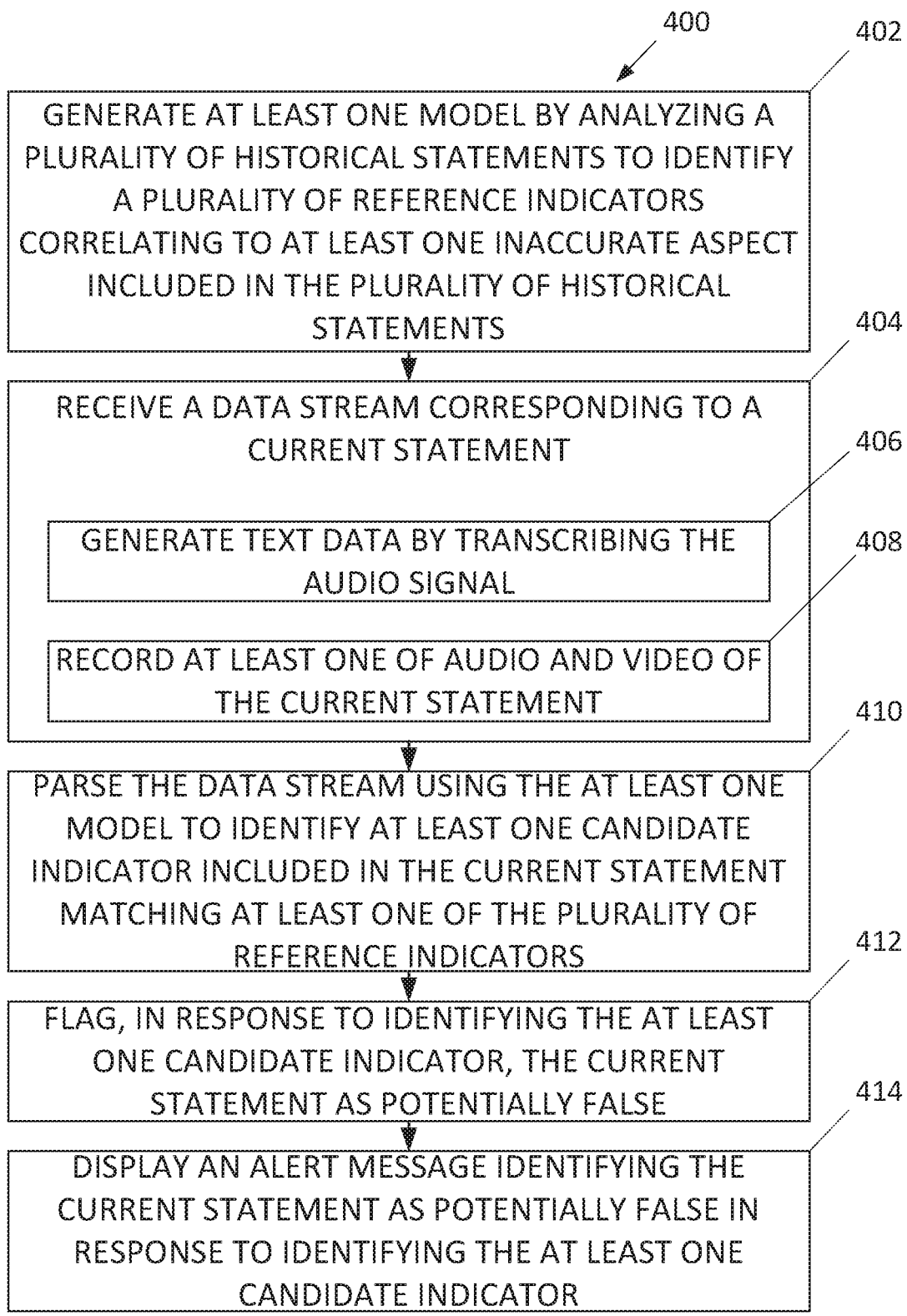
FIG. 4 depicts an exemplary method for analyzing the veracity of statements using the VA system shown in FIG. 1.

FIG. 4 depicts an exemplary computer-implemented method 400 for reviewing the veracity of statements. Method 400 may be performed by VA computing device 102 (shown in FIG. 1).

Method 400 may include generating 402 at least one model by analyzing a plurality of historical statements to identify a plurality of reference indicators correlating to at least one inaccurate aspect included in the plurality of historical statements. In some embodiments, each of the plurality of historical statements includes at least one of audio data, video data, and text data. In some embodiments, generating 402 the at least one model may be performed by analytics module 230 (shown in FIG. 2).

Method 400 may further include receiving 404 a data stream corresponding to a current statement. In some embodiments, the data stream includes at least one of audio data, video data, and text data. In certain embodiments, the data stream is received from a wearable technology device (e.g., wearable technology device 112). In some embodiments, the data stream includes an audio signal and method 400 further includes generating 406 text data by transcribing the audio signal. In certain embodiments, wherein VA computing device 102 is a wearable technology device, method 400 includes recording 408 at least one of audio and video of the statement.

Method 400 may further include parsing 410 the data stream using the at least one model to identify at least one candidate indicator included in the current statement matching at least one of the plurality of reference indicators. In some embodiments, parsing 410 the data stream may be performed by parsing module 232 (shown in FIG. 2).

Method 400 may further include flagging 412, in response to identifying the at least one candidate indicator, the current statement as potentially false. In some embodiments, flagging 412 the current statement as potentially false may be performed by parsing module 232 (shown in FIG. 2).

In some embodiments, method 400 may further include displaying 414 an alert message identifying the current statement as potentially false in response to identifying the at least one candidate indicator. In some embodiments, displaying 414 the alert message may be performed using media output component 215 (shown in FIG. 2). Additionally or alternatively, displaying 414 the alert message may be performed using a device external to VA computing device 102, such as wearable technology device 112. The method 400 may include additional, less, or alternate actions, including those discussed elsewhere herein.

Exemplary Method for Identifying Conflicting Statements

Figure 5:
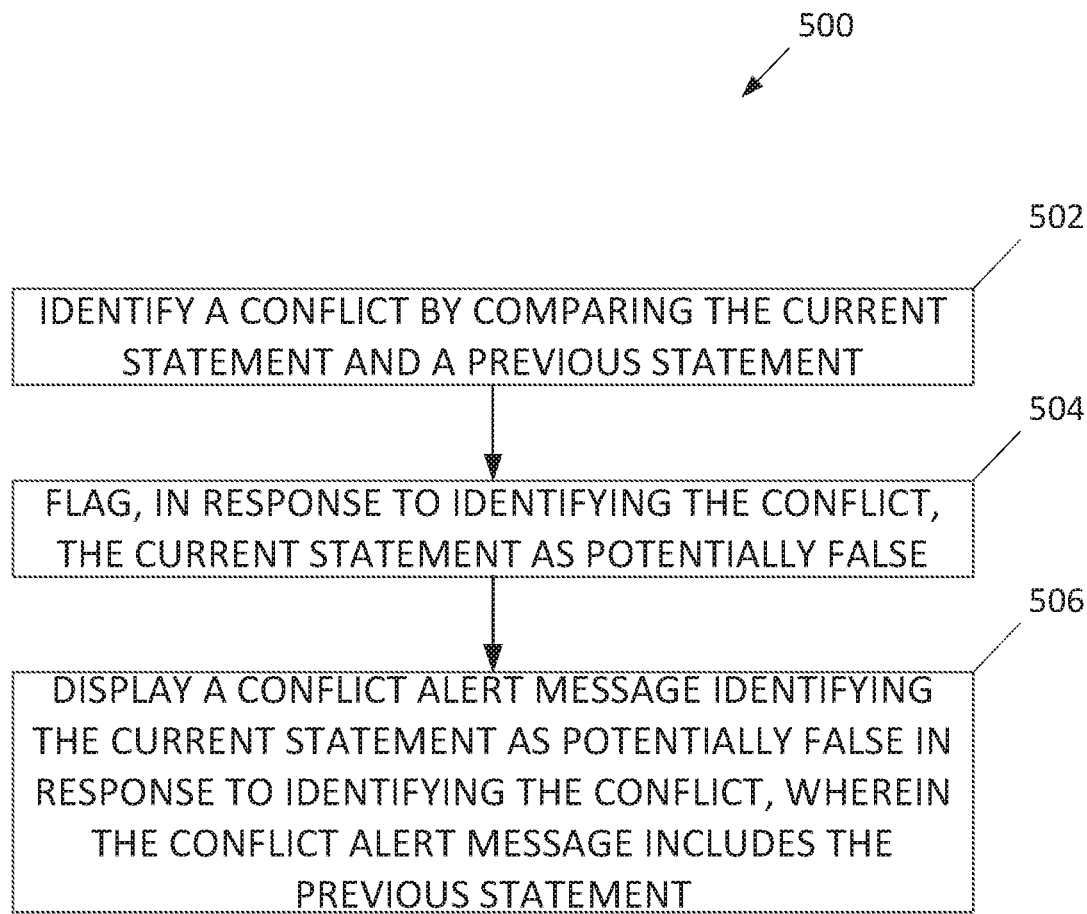
FIG. 5 depicts an exemplary method for identifying conflicting statements using the VA system shown in FIG. 1.

FIG. 5 depicts an exemplary computer-implemented method 500 for identifying conflicting statements. Method 500 may be performed by VA computing device 102 (shown in FIG. 1).

Method 500 may include identifying 502 a conflict by comparing the current statement and a previous statement. In some embodiments, identifying 502 the conflict may be performed by parsing module 232 (shown in FIG. 2).

Method 500 may further include flagging, in response to identifying the conflict, the current statement as potentially false. In some embodiments, flagging the current statement as potentially false may be performed by parsing module 232 (shown in FIG. 2).

In some embodiments, method 500 may further include displaying 506 a conflict alert message identifying the current statement as potentially false in response to identifying the conflict, wherein the conflict alert message includes the previous statement. In some embodiments, displaying 506 the conflict alert message may be performed using media output component 215 (shown in FIG. 2). Additionally or alternatively, displaying 506 the alert message may be performed using a device external to VA computing device 102, such as wearable technology device 112. The method 500 may include additional, less, or alternate actions, including those discussed elsewhere herein.

Exemplary Method for Implementing a Chatbot

Figure 6:
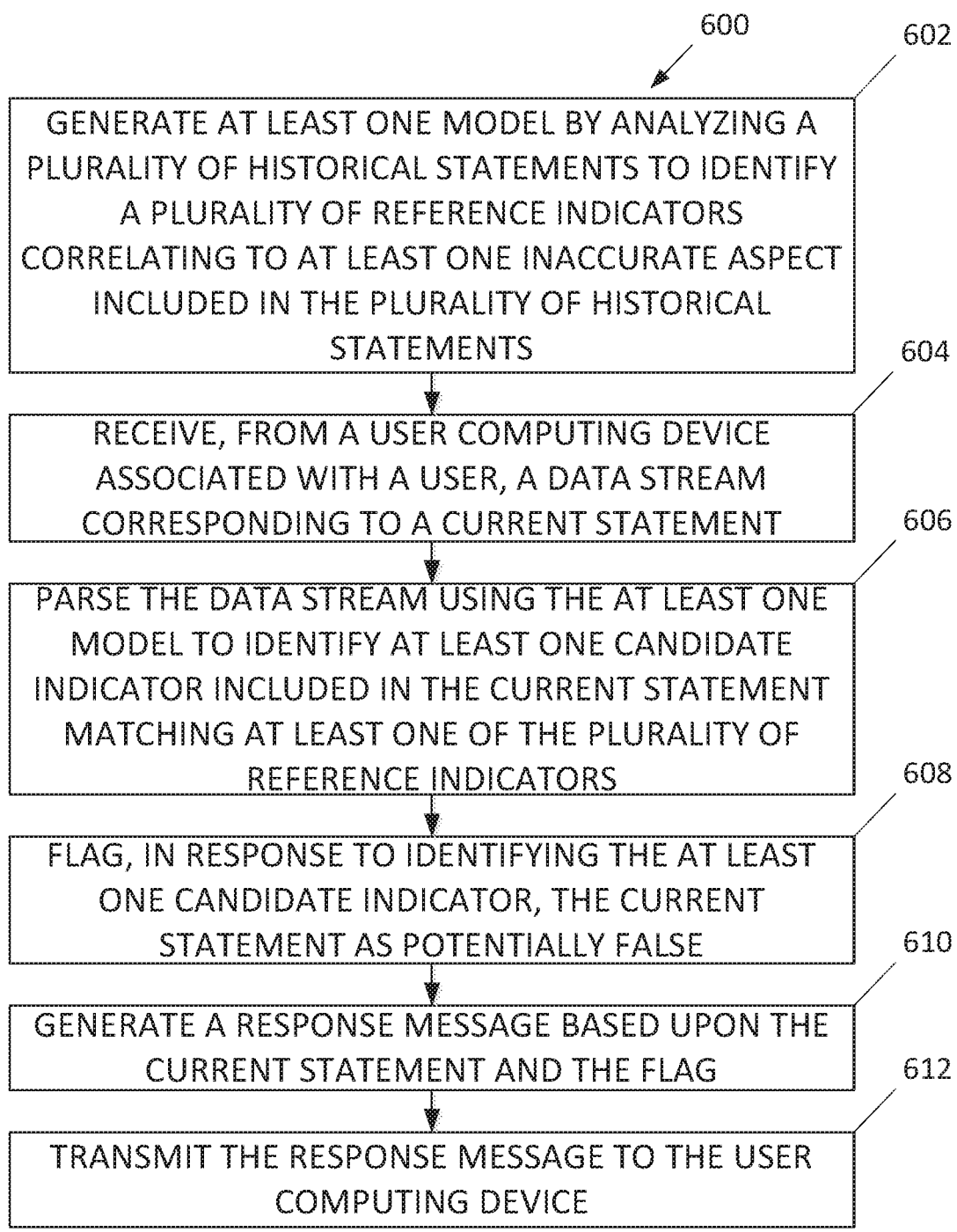
FIG. 6 depicts an exemplary method for implementing a chatbot capable of analyzing the veracity of a statement submitted by a user using the VA system shown in FIG. 1.

FIG. 6 depicts an exemplary computer-implemented method 600 for implementing a chatbot capable of analyzing the veracity of a statement submitted by a user. Method 600 may be performed by VA computing device 102 (shown in FIG. 1).

Method 600 may include generating 602 at least one model by analyzing a plurality of historical statements to identify a plurality of reference indicators correlating to at least one inaccurate aspect included in the plurality of historical statements. In some embodiments, each of the plurality of historical statements includes at least one of audio data, video data, and text data. In some embodiments, generating 602 the at least one model may be performed by analytics module 230 (shown in FIG. 2).

Method 600 may further include receiving 604, from a user computing device (e.g., mobile device 110) associated with a user, a data stream corresponding to a current statement. In some embodiments, the data stream includes at least one of audio data, video data, and text data. In some embodiments, the data stream includes an audio signal and method 400 further includes generating 406 text data by transcribing the audio signal.

Method 600 may further include parsing 606 the data stream using the at least one model to identify at least one candidate indicator included in the current statement matching at least one of the plurality of reference indicators. In some embodiments, parsing 606 the data stream may be performed by parsing module 232 (shown in FIG. 2).

Method 600 may further include flagging 608, in response to identifying the at least one candidate indicator, the current statement as potentially false. In some embodiments, flagging 608 the current statement as potentially false may be performed by parsing module 232 (shown in FIG. 2).

Method 600 may further include generating 610 a response message based upon the current statement and the flag and transmitting 612 the response message to the user computing device. In some embodiments, the response message is at least one of an audio message, a video message, and a text message. In some embodiments, generating 610 the response message may be performed by analytics module 230 (shown in FIG. 2).

Machine Learning and Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as images, object statistics and information, audio and/or video records, text, and/or actual true or false values. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or other types of machine learning or artificial intelligence.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs.

As described above, the systems and methods described herein may use machine learning, for example, for pattern recognition. That is, machine learning algorithms may be used by VA computing device 102 to identify patterns within a large number of historical statements to generate models including reference indicators correlated with inaccuracy of a statement. Accordingly, the systems and methods described herein may use machine learning algorithms for both pattern recognition and predictive modeling.

Exemplary Embodiments

The present embodiments may relate to secondary systems that verify potential fraud or the absence thereof. Artificial intelligence, machine learning, and/or chatbots may be employed to verify veracity of statements used in connection with insurance or loan applications, and/or insurance claims. For instance, a veracity analyzer (VA) computing device includes a processor in communication with a memory device, and may be configured to: (1) generate at least one model by analyzing a plurality of historical statements to identify a plurality of reference indicators correlating to at least one inaccurate aspect included in the plurality of historical statements; (2) receive a data stream corresponding to a current statement; (3) parse the data stream using the at least one model to identify at least one candidate indicator included in the current statement matching at least one of the plurality of reference indicators; and/or (4) flag, in response to identifying the at least one candidate indicator, the current statement as potentially false. The VA computing device may be a chatbot or robo-advisor in some embodiments. The computing device may include additional, less, or alternate functionality, including that discussed elsewhere herein.

In another aspect, a computer-implemented method for reviewing veracity of statements may be provided. The computer-implemented method may be performed by a veracity analyzer (VA) computing device, which may be a chatbot or a robo-advisor in some embodiments, that includes at least one processor in communication with a memory device. The computer-implemented method may include: (1) generating, by the VA computing device, at least one model by analyzing a plurality of historical statements to identify a plurality of reference indicators correlating to at least one inaccurate aspect included in the plurality of historical statements; (2) receiving, by the VA computing device, a data stream corresponding to a current statement; (3) parsing, by the VA computing device the data stream using the at least one model to identify at least one candidate indicator included in the current statement matching at least one of the plurality of reference indicators; and/or (4) flagging, by the VA computing device, in response to identifying the at least one candidate indicator, the current statement as potentially false. The method may include additional, less, or alternate actions, including those discussed elsewhere herein.

In another aspect, a non-transitory computer-readable media having computer-executable instructions embodied thereon may be provided that, when executed by a veracity analyzer (VA) computing device including a processor in communication with a memory device, cause the processor to: (1) generate at least one model by analyzing a plurality of historical statements to identify a plurality of reference indicators correlating to at least one inaccurate aspect included in the plurality of historical statements; (2) receive a data stream corresponding to a current statement; (3) parse the data stream using the at least one model to identify at least one candidate indicator included in the current statement matching at least one of the plurality of reference indicators; and/or (4) flag, in response to identifying the at least one candidate indicator, the current statement as potentially false. The instructions may direct additional, less, or alternate functionality, including that discussed elsewhere herein.

In another aspect, a chatbot computing device comprising at least one processor in communication with a memory device may be provided. The processor may be configured to (1) generate at least one model by analyzing a plurality of historical statements to identify a plurality of reference indicators correlating to at least one inaccurate aspect included in the plurality of historical statements; (2) receive, from a user computing device associated with a user, a data stream corresponding to a current statement; (3) parse the data stream using the at least one model to identify at least one candidate indicator included in the current statement matching at least one of the plurality of reference indicators; (4) flag, in response to identifying the at least one candidate indicator, the current statement as potentially false; (5) generate a response message based upon the current statement and the flag; and/or (6) transmit the response message to the user computing device. The chatbot computing device may include additional, less, or alternate functionality, including that discussed elsewhere herein.

ADDITIONAL CONSIDERATIONS

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps," or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an exemplary embodiment, the system is executed on a single computer system, without requiring a connection to a sever computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

I claim:

1. A veracity analyzer (VA) computing device comprising at least one processor in communication with a memory device, said processor configured to:
   retrieve a plurality of historical statements for generating at least one model;
   generate the at least one model using machine learning or artificial intelligence techniques and the plurality of historical statements as an input, the at least one model configured to identify a plurality of reference indicators correlating to at least one inaccurate aspect included in the plurality of historical statements, wherein the plurality of reference indicators include at least one of audio reference indicators and visual reference indicators, wherein the audio reference indicators include voice inflections and tones, and wherein the visual reference indicators include body language;
   store the at least one generated model in a memory device;
   receive a data stream corresponding to a current statement made by a first user;
   analyze the data stream using the at least one model to identify at least one candidate indicator included in the current statement matching at least one of the plurality of reference indicators, wherein the at least one candidate indicator matches at least one of a voice inflection and a tone of the audio reference indicators and a body language of the visual reference indicators;

generate, in real-time and in response to identifying the at least one candidate indicator, a flag for each portion of the current statement including the at least one candidate indicator;

display, on a user device of a second user, an alert message including (i) each flagged portion of the current statement and (ii) a respective candidate indicator associated with each flagged portion; and display, in conjunction with the alert message, a prompt to the second user to perform at least one action in response to each flagged portion of the current statement to obtain additional information related to each flagged portion from the first user.

2. The VA computing device of claim 1, wherein the at least one action includes asking the first user follow-up questions related to at least one of forensic evidence and differences in statements between the first user.

3. The VA computing device of claim 1, wherein the processor is further configured to:

identify a conflict by comparing the current statement and a previous statement; and in response to identifying the conflict, generate a flag for the current statement.

4. The VA computing device of claim 3, wherein the processor is further configured to display a conflict alert message including the flag of the current statement and the previous statement.

5. The VA computing device of claim 1, wherein the data stream includes an audio signal, and wherein the processor is further configured to generate text data by transcribing the audio signal.

6. The VA computing device of claim 1, wherein each of the plurality of historical statements include at least one of audio data, video data, and text data.

7. The VA computing device of claim 1, wherein the data stream includes at least one of audio data, video data, and text data.

8. The VA computing device of claim 1, wherein at least some of the plurality of historical statements include a known true or false value.

9. The VA computing device of claim 1, wherein to receive a data stream corresponding to the current statement, the processor is configured to receive the data stream from a wearable technology device.

10. The VA computing device of claim 1, wherein the VA computing device is a wearable technology device, and wherein to receive a data stream corresponding to the current statement, the VA computing device is configured to record at least one of audio and video of the current statement.

11. A computer-implemented method for reviewing veracity of statements, said computer-implemented method performed by a veracity analyzer (VA) computing device including at least one processor in communication with a memory device, said computer-implemented method comprising:

retrieving, by the VA computing device, a plurality of historical statements for generating at least one model;

generating, by the VA computing device using machine learning or artificial intelligence techniques and the plurality of historical statements as an input, the at least one model configured to identify a plurality of reference indicators correlating to at least one inaccurate aspect included in the plurality of historical statements, wherein the plurality of reference indicators include at least one of audio reference indicators and visual reference indicators, wherein the audio reference indicators include voice inflections and tones, and wherein the visual reference indicators include body language;

storing, by the VA computing device, the at least one generated model in a memory device;

receiving, by the VA computing device, a data stream corresponding to a current statement made by a first user;

analyzing, by the VA computing device, the data stream using the at least one model to identify at least one candidate indicator included in the current statement matching at least one of the plurality of reference indicators, wherein the at least one candidate indicator matches at least one of a voice inflection and a tone of the audio reference indicators and a body language of the visual reference indicators;

generating, by the VA computing device, in real-time and in response to identifying the at least one candidate indicator, a flag for each portion of the current statement including the at least one candidate indicator;

displaying, by the VA computing device, on a user device of a second user, an alert message including (i) each flagged portion of the current statement and (ii) a respective candidate indicator associated with each flagged portion; and displaying, by the VA computing device, in conjunction with the alert message, a prompt to the second user to perform at least one action in response to each flagged portion of the current statement to obtain additional information related to each flagged portion from the first user.

12. The computer-implemented method of claim 11, wherein the at least one action includes asking the first user follow-up questions related to at least one of forensic evidence and differences in statements between the first user.

13. The computer-implemented method of claim 11, further comprising:

identifying, by the VA computing device, a conflict by comparing the current statement to a previous statement; and generating, by the VA computing device, in response to identifying a conflict, a flag for the current statement.

14. The computer-implemented method of claim 13, further comprising displaying, by the VA computing device a conflict alert message including the flag of the current statement and the previous statement.

15. The computer-implemented method of claim 11, wherein the data stream includes an audio signal, and wherein the computer-implemented method further comprises generating, by the VA computing device, text data by transcribing the audio signal.

16. A non-transitory computer-readable media having computer-executable instructions embodied thereon, wherein when executed by a veracity analyzer (VA) computing device including a processor in communication with a memory device, the computer-executable instructions cause the processor to:

retrieve a plurality of historical statements for generating at least one model;

generate the at least one model using machine learning or artificial intelligence techniques and the plurality of historical statements as an input, the at least one model configured to identify a plurality of reference indicators correlating to at least one inaccurate aspect included in the plurality of historical statements, wherein the plurality of reference indicators include at least one of audio reference indicators and visual reference indicators, wherein the audio reference indicators include voice inflections and tones, and wherein the visual reference indicators include body language;

store the at least one generated model in a memory device;

receive a data stream corresponding to a current statement made by a first user;

analyze the data stream using the at least one model to identify at least one candidate indicator included in the current statement matching at least one of the plurality of reference indicators, wherein the at least one candidate indicator matches at least one of a voice inflection and a tone of the audio reference indicators and a body language of the visual reference indicators;

generate, in real-time and in response to identifying the at least one candidate indicator, a flag for each portion of the current statement including the at least one candidate indicator;

display, on a user device of a second user, an alert message including (i) each flagged portion of the current statement and (ii) a respective candidate indicator associated with each flagged portion; and display, in conjunction with the alert message, a prompt to the second user to perform at least one action in response to each flagged portion of the current statement to obtain additional information related to each flagged portion from the first user.

17. The non-transitory computer-readable media of claim 16, wherein the computer-executable instructions further cause the processor to display an alert message identifying the current statement as potentially false in response to identifying the at least one candidate indicator at least one action includes asking the first user follow-up questions related to at least one of forensic evidence and differences in statements between the first user.

18. The non-transitory computer-readable media of claim 16, wherein the computer-executable instructions further cause the processor to:
   identify a conflict by comparing the current statement to a previous statement; and
   response to identifying a conflict, generate a flag for the current statement.

19. The non-transitory computer-readable media of claim 18, wherein the computer-executable instructions further cause the processor to display a conflict alert message including the flag of the current statement and the previous statement.

20. The non-transitory computer-readable media of claim 16, wherein the data stream includes an audio signal, and wherein the computer-executable instructions further cause the processor to generate text data by transcribing the audio signal.

* * * * *